(12) United States Patent (10) Patent No.: US 10,076,724 B2
Codoluto et al. (45) Date of Patent: Sep. 18, 2018

(54) METHODS AND SYSTEMS FOR MARINE SULFUR DIOXIDE EMISSION REDUCTION

(71) Applicant: ExxonMobil Research and Engineering Company, Annandale, NJ (US)

(72) Inventors: Stephen C. Codoluto, Spring, TX (US); Venkatesh Subramania, Houston, TX (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 0 days.

(21) Appl. No.: 15/606,048

(22) Filed: May 26, 2017

(65) Prior Publication Data

US 2017/0368501 A1 Dec. 28, 2017

Related U.S. Application Data

(60) Provisional application No. 62/353,659, filed on Jun. 23, 2016.

(51) Int. Cl.
*B01D 53/14* (2006.01)
*B01D 53/50* (2006.01)
(Continued)

(52) U.S. Cl.
CPC ........... *B01D 53/507* (2013.01); *B01D 47/10* (2013.01); *B01D 47/14* (2013.01); *B01D 53/501* (2013.01); *B01D 53/78* (2013.01); *B01D 2251/304* (2013.01); *B01D 2251/606* (2013.01); *B01D 2252/1035* (2013.01)

(58) Field of Classification Search
CPC .. B01D 53/1481; B01D 53/50; B01D 53/504; B01D 53/78; B01D 53/92; B01D 46/0036; B01D 46/0027; B01D 46/4281; B01D 47/10; B01D 2201/208; B01D 2201/265; B01D 2247/10; B01D 2252/1035;
(Continued)

(56) References Cited

U.S. PATENT DOCUMENTS 4,600,567 A    7/1986  Reeder
9,399,183 B2 * 7/2016  McVay ............. B01D 46/0038
(Continued)

FOREIGN PATENT DOCUMENTS

CN    102791357 A  * 11/2012 ............. B01D 47/06
DE    102009059773 A1 *  6/2011 ............. B01D 47/06
(Continued)

OTHER PUBLICATIONS

The International Search Report and Written Opinion of PCT/US2017/034612 dated Aug. 14, 2017.

*Primary Examiner* — Timothy C Vanoy
(74) *Attorney, Agent, or Firm* — Glenn T. Barrett

(57) ABSTRACT

Improved methods and systems are provided for the on-board removal of sulfur dioxide generated by a marine vessel. The method includes spraying an alkaline fluid into the flue gas to produce a saturated flue gas stream containing the alkaline fluid; and flowing the saturated flue gas stream containing the alkaline fluid through a venturi to cause the particulates in the flue gas to impact the alkaline fluid and react at least a portion of the sulfur dioxide with the alkaline fluid.

31 Claims, 1 Drawing Sheet

(51) Int. Cl.
  *B01D 53/78* (2006.01)
  *B01D 53/92* (2006.01)
  *B01D 46/00* (2006.01)
  *B01D 47/10* (2006.01)
  *B01D 47/14* (2006.01)

(58) Field of Classification Search
  CPC ...... B01D 2257/302; B01D 2258/0283; B01D 2259/4566
  See application file for complete search history.

(56) References Cited

U.S. PATENT DOCUMENTS

2016/0332113 A1* 11/2016 Jenkins .................. B01D 53/18
2017/0165609 A1* 6/2017 Norling .................. B01D 53/79

FOREIGN PATENT DOCUMENTS

| EP | 2574393 A1 | 4/2013 | |
| EP | 3094400 A1 * | 11/2016 | ............. B01D 53/18 |
| JP | 6188033 B2 * | 8/2017 | ............. B01D 53/18 |
| WO | 2015/106355 A1 | 7/2015 | |

* cited by examiner

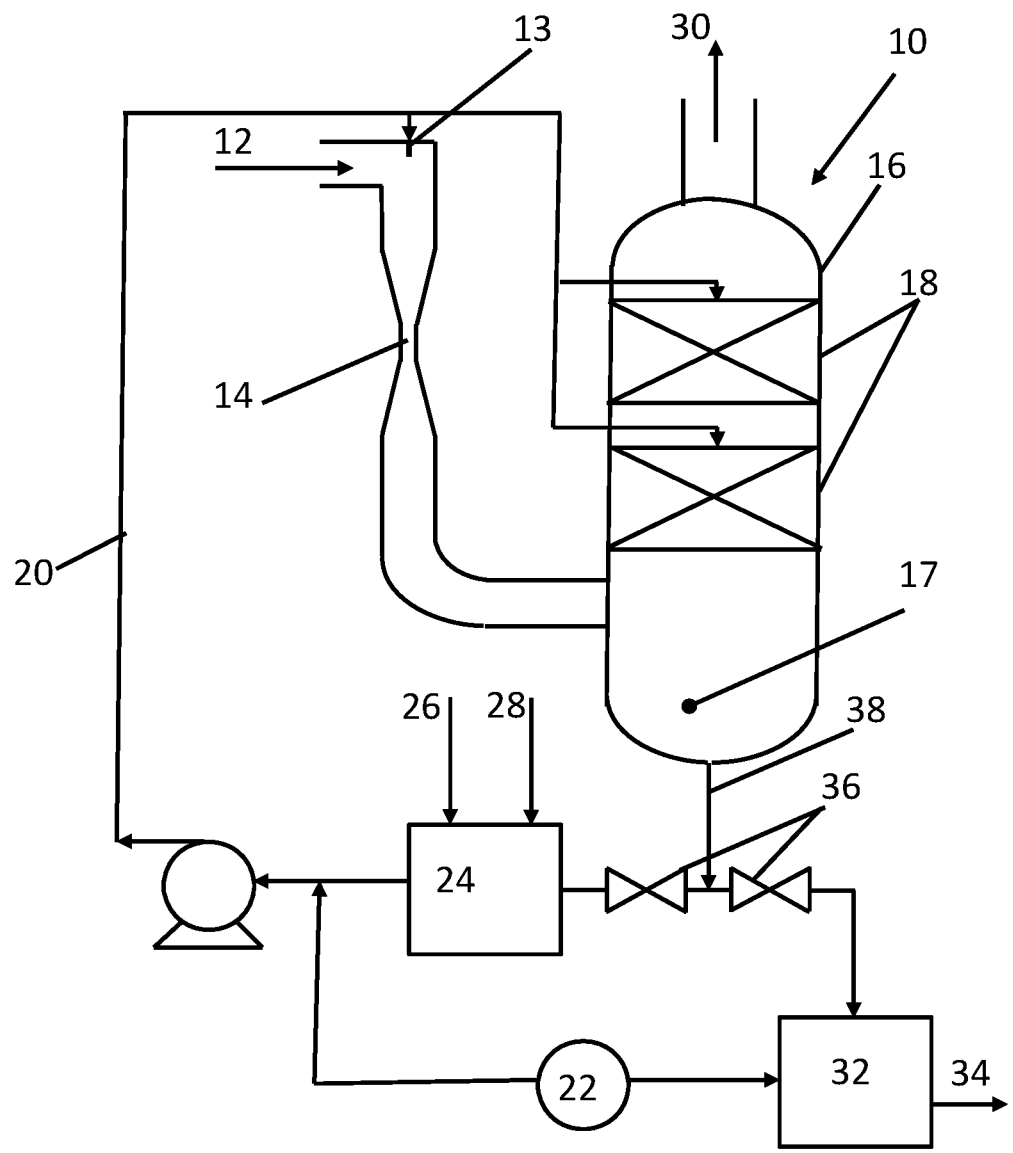

METHODS AND SYSTEMS FOR MARINE SULFUR DIOXIDE EMISSION REDUCTION

CROSS-REFERENCE TO RELATED APPLICATIONS

This application claims priority to U.S. Provisional Application Ser. No. 62/353,659 filed Jun. 23, 2016, which is herein incorporated by reference in its entirety.

The present application relates to methods and systems for the on-board removal of sulfur dioxide generated by a marine vessel.

BACKGROUND

As global sulfur caps and other sulfur regulations are imposed on the marine industry there will be an increasing need to adopt new technologies for reducing sulfur emissions from marine vessels. Currently, some marine vessels utilize a single stage disengaging drum type scrubber. Such systems can impose significant size, weight, and pressure drop requirements, thereby limiting the implementation of such technologies for some vessels.

It would therefore be desirable to provide new methods and systems for reducing sulfur emissions from marine vessels that can avoid one or more of the disadvantages associated with traditional single-stage scrubbers.

SUMMARY

Improved methods and systems are provided for the on-board removal of sulfur dioxide generated by a marine vessel.

In one aspect, a method is provided for scrubbing a marine vessel flue gas containing particulates and sulfur dioxide. The method includes spraying an alkaline fluid into the flue gas to produce a saturated flue gas stream containing the alkaline fluid; and flowing the saturated flue gas stream containing the alkaline fluid through a venturi to cause the particulates in the flue gas to impact the alkaline fluid and react at least a portion of the sulfur dioxide with the alkaline fluid.

In another aspect, a system for scrubbing a marine vessel flue gas is provided. The system includes a flue gas stream containing particulates and sulfur dioxide produced from the marine vessel; an alkaline fluid spraying system adapted to spray an alkaline fluid into the flue gas stream to produce a saturated flue gas stream containing the alkaline fluid; and a venturi adapted to receive the saturated flue gas stream and impact the particulates in the flue gas onto the fluid and react at least a portion of the sulfur dioxide with the alkaline fluid.

BRIEF DESCRIPTION OF THE DRAWINGS

FIG. 1 is a schematic illustrating an improved system for the on-board removal of sulfur dioxide according to one or more embodiments of the present invention.

DETAILED DESCRIPTION

Improved methods and systems are provided for the on-board removal of sulfur dioxide generated by a marine vessel. In embodiments, the methods and systems disclosed herein can provide for the removal of sulfur dioxide and particulates from the flue gas of a marine vessel while avoiding one or more of the disadvantages associated with traditional marine scrubbers. For example, in embodiments, the system can occupy less space and/or weigh less than a traditional marine scrubber having equivalent sulfur reduction capabilities. Furthermore, such systems can be less restrictive on the flue gas stream thereby reducing the demand or eliminating the need for induced draft or forced draft fans to move the flue gas through the scrubber. Similarly, energy savings can be realized in some embodiments due to the reduction in pressure drop imposed by such improved systems. Operating cost savings may also be realized by using readily available scrubbing fluids and reductants, as well as, open-loop and closed-loop switching capabilities.

Such advantages may be realized by the use of a two-stage scrubbing system which includes a first stage jet ejector venturi in which an alkaline fluid is spayed into the flue gas to produce a saturated flue gas stream containing the alkaline fluid and the saturated flue gas flows through a venturi. Notably, the alkaline fluid can be sprayed into the throat of the venturi in sufficient quantities to cause the flow of fluid through the venturi to generate a draft, propelling the saturated flue gas through the venturi. In some embodiments, the exhaust stream is fed through the scrubbing system without the use of a fan. In other embodiments, a fan may be employed to facilitate the flow of flue gas through the scrubbing system; however, it is expected that the demand on the fan would be lower than if such a jet ejector venturi were not employed. In addition to generating draft to propel the flue gas through the exhaust system, the venturi can also act to cause particulates to impact the alkaline fluid and sulfur dioxide in the flue gas to react to the alkaline reductant in the fluid. Advantageously, a majority of the sulfur dioxide may be reacted in this stage and reduced to sulfur-containing salts.

In a second stage, the saturated flue gas is introduced into a disengaging/scrubbing tower. In the scrubbing tower, sulfur-containing salts and water can be separated from the flue gas in a disengaging zone and additional sulfur dioxide and water removal can be performed in packing sections of the scrubbing tower before the exhaust gas is finally discharged to the atmosphere.

Advantageously, substantial amounts of particulates may be scrubbed and most of the SOx can be converted to salts prior to the flue gas reaching the disengaging/scrubbing tower. As such most of the physical separation of the particulates and sulfur-containing components of the flue gas occurs as the flue gas flows into the disengaging zone of the scrubber.

Advantageously, seawater (e.g., obtained as needed from the sea and/or stored on the vessel in a tank) can be employed with the addition of an alkaline reductant to act as a scrubbing fluid. Although sodium hydroxide may be employed as a reductant in the present systems, sodium bicarbonate or sodium carbonate may advantageously be employed in embodiments because of the improved effectiveness of the two-stage systems disclosed herein and the natural alkalinity of seawater. The reaction of sodium bicarbonate and sulfur dioxide is illustrated in Eq. 1.

$$2NaHCO_3 + SO_2 \rightarrow Na_2SO_3 + 2CO_2 + H_2O \qquad (Eq. 1)$$

The systems and methods of the present invention may be employed on any marine vessel for which flue gas sulfur emission abatement is desired. For example, the system may be employed on vessels operating in a power range of from 0 to 80 MW, including main, auxiliary engines, and boilers.

The systems and methods of the present invention may also be employed with flue gases having various compositions. For example, the systems and methods may be employed with flue gases having a $SO_2$ composition of 150 to 2500 ppmv, such as 150 to 2000 ppmv, or 150 to 1800 ppmv, or 150 to 1500 ppmv, or 150 to 1200 ppmv, or 150 to 1000 ppmv, or 150 to 500 ppmv, or 2000 to 2500 ppmv, or 1800 to 2500 ppmv, or 1500 to 2500 ppmv, or 1000 to 2500 ppmv, or 500 to 2500 ppmv. The flue gas may contain, for example, $CO_2$ at 0 to 6 volume %, $O_2$ at 2 to 15 volume %, $H_2O$ at 3 to 10 volume %, and $N_2$ at up to 95 volume %.

Sulfur dioxide removal for the system may be in the range of 85-90% (mass transfer basis) with stoichiometric amounts of sodium bicarbonate used as the reductant. Efficiencies greater than 90%, such as up to 99%, may be achieved using greater than stoichiometric amounts of sodium bicarbonate. Particulate removal for the system may be in the range of 95-99% (mass transfer basis) for particles of 2 micron or larger, and 90%-99% for particles of 1 micron and larger.

An exemplary embodiment of a system for marine sulfur emission reduction is illustrated in FIG. 1. System 10 may be contained on a marine vessel, and receive a flue gas 12 from the marine vessel. The flue gas 12, which contains sulfur dioxide and particulates, is mixed with an alkaline fluid, which is sprayed into the flue gas 12 via one or more nozzles 13, to saturate the flue gas 12 with the alkaline fluid. The spray from nozzles 13 may be in the general direction of the throat of venturi 14, facilitating the impaction of particulates in the flue gas onto the alkaline fluid and the reaction of the sulfur dioxide with the fluid as the saturated flue gas passes through the throat and into the venturi.

The exhaust gas then flows into the disengaging zone 17 of separator 16 where liquid and salts separate from the flue gas and are evacuated via liquid effluent line 38. The gases then travel through one or more packing zones 18, which can be structured or random packing, before exiting the separator 16 through stack 30. Alkaline fluid may be sprayed onto the packing to facilitate the removal of unreacted sulfur dioxide still remaining in the exhaust gas in separator 16 and to facilitate removal of entrained water in the gas.

In the embodiment of FIG. 1, no induced draft or forced draft fans are required to move flue gas 12 through system 10. This may be achieved because the co-current water jet from the spray nozzle located at the top of the jet scrubber is capable of inducing or increasing flue gas pressure within the scrubber. The water spray should be of sufficient volume and pressure to provide both adequate flue gas entrainment and enough contacting power and droplet size for scrubbing of particulate. In other embodiments, an induced draft or forced draft fan may be employed; however, the use of such a jet ejector venturi is expected to reduce the demand required by such a fan.

The system 10 can operate in closed loop, open loop (optionally, with partial recycle), or can be switchable between closed loop and open loop operation. Switching between operation modes can be accomplished, for example, by opening or closing the desired valves 36 to direct the flow of liquid effluent from line 38 to sludge tank 32, to alkaline fluid storage tank 24, or portions of the liquid effluent to both.

On on-board water treatment and/or monitoring system may also be employed to analyze the water quality or treat the effluent contained in sludge tank 32 before it is discharged to the ocean or other appropriate discharge location. Sea water 22 may be added to sludge tank 32 as needed, for example, to dilute contaminants captured in sludge tank 32, to treat the effluent, or to facilitate physical separation of its contents. Neutralizing and other additives may be added to sludge tank 32 as needed. The contents of the storage tank 32 can be discharged via one or more discharge ports 34 as needed.

All or a portion of the liquid effluent may also be recycled to alkaline fluid storage tank 24. The liquid effluent may be treated prior to recycle by an on-board water treatment system. In storage tank 24, reductant 26 is added to fresh water 28. Reductant 26 may be any material suitable for reaction with sulfur dioxide, for example, sodium bicarbonate or sodium carbonate. Sea water 22 may be added on-demand to the fluid in storage tank 24 to use as alkaline fluid 20. In closed loop operation, stored onboard freshwater 28 can be added instead of sea water 22.

System 10 may be used in once-through mode or, in some embodiments, at least a portion of the flue gas that has passed through the packing sections 18 can be recycled, for example, upstream of the venturi 14.

Thus, in embodiments, methods for scrubbing a marine vessel flue gas containing particulates and sulfur dioxide may include spraying an alkaline fluid into the flue gas to produce a saturated flue gas stream containing the alkaline fluid; and flowing the saturated flue gas stream containing the alkaline fluid through a venturi to cause the particulates in the flue gas to impact the alkaline fluid and react at least a portion of the sulfur dioxide with the alkaline fluid.

In any embodiment, the alkaline fluid may be added in sufficient quantities to enable the flue gas to flow through the venturi under suction without the assistance of a fan. Further, in any embodiment, the alkaline fluid is sprayed co-currently with the flue gas stream in the direction of the venturi.

In any embodiment, the method may include flowing the flue gas through a separator downstream of the venturi for separating water from the flue gas. The separator may be, for example, a scrubber. In any embodiment, the scrubber may have a disengaging zone for receiving flue gas that has passed through the venturi and at least one packing section for receiving flue gas after it passes through the disengaging zone.

In any embodiment, the alkaline fluid may comprise sea water. In any embodiment, the alkaline fluid may include sodium bicarbonate, sodium carbonate or a combination thereof.

In any embodiment, the method may be performed onboard the marine vessel. In any embodiment, the flue gas of the marine vessel may have a $SO_2$ concentration of 150 to 2500 ppmv. In any embodiment, the marine vessel may have an operating power in the range of 0 to 80 MW.

In any embodiment, 85% to 99% of the sulfur dioxide in the flue gas may be removed, as measured on a mass transfer basis. In any embodiment, 95 to 99% of particles of 2 micron or larger in the flue gas may be removed, as measured on a mass transfer basis. In any embodiment, 90 to 99% of particles of 1 micron and larger in the flue gas may be removed, as measured on a mass transfer basis.

In any embodiment, the alkaline fluid may be collected and recycled.

Furthermore, in embodiments, a system for scrubbing a marine vessel flue gas may include a flue gas stream containing particulates and sulfur dioxide produced from the marine vessel; an alkaline fluid spraying system adapted to spray an alkaline fluid into the flue gas stream to produce a saturated flue gas stream containing the alkaline fluid; and a venturi adapted to receive the saturated flue gas stream and impact the particulates in the flue gas onto the fluid and react at least a portion of the sulfur dioxide with the alkaline fluid.

In any embodiment, the alkaline fluid spraying system may spray the alkaline fluid in sufficient quantities to enable the flue gas to flow through the venturi under suction without the assistance of a fan. Further, in any embodiment, the alkaline fluid spraying system sprays the alkaline fluid co-currently with the flue gas stream in the direction of the venturi.

In any embodiment, the system may include a separator downstream of the venturi for separating water from the flue gas. The separator may be, for example, a scrubber. In any embodiment, the scrubber may have a disengaging zone for receiving flue gas that has passed through the venturi and at least one packing section for receiving flue gas after it passes through the disengaging zone.

In any embodiment, the alkaline fluid may comprise sea water. In any embodiment, the alkaline fluid may include sodium bicarbonate, sodium carbonate or a combination thereof.

In any embodiment, the system may be located onboard the marine vessel. In any embodiment, the flue gas may have a $SO_2$ concentration of 150 to 2500 ppmv. The marine vessel may have an operating power in the range of 0 to 80 MW.

In any embodiment, the system may remove 85% to 99% of the sulfur dioxide in the flue gas, as measured on a mass transfer basis. In any embodiment, the system may remove 95 to 99% of particles of 2 micron or larger in the flue gas, as measured on a mass transfer basis. In any embodiment, the system may remove 90 to 99% of particles of 1 micron and larger in the flue gas, as measured on a mass transfer basis.

In any embodiment, the system may operate in a closed loop mode, an open loop mode, or may be switchable between open loop and closed loop modes. In closed loop mode, the sulfur-containing salts and particulates captured by the system may be stored in a storage tank. During closed loop operation, most of the water can be recycled each pass, for example, at least 80 volume %, at least 90 volume %, or at least 95 volume % of the total water injected into the system per pass, to minimize the amount of makeup freshwater and/or sea water that is added to the system.

The invention claimed is:

1. A method for scrubbing a marine vessel flue gas containing particulates and sulfur dioxide comprising:
   spraying an alkaline fluid into the flue gas to produce a saturated flue gas stream containing the alkaline fluid;
   flowing the saturated flue gas stream containing the alkaline fluid through a venturi to cause the particulates in the flue gas to impact the alkaline fluid and react at least a portion of the sulfur dioxide with the alkaline fluid; and
   flowing the saturated flue gas stream through a separator downstream of the venturi for separating water from the flue gas, wherein the separator is a scrubber, wherein the scrubber has a disengaging zone for receiving flue gas that has passed through the venturi and at least one packing section for receiving flue gas after it passes through the disengaging zone.

2. The method of claim 1, wherein the alkaline fluid is added in sufficient quantities to enable the flue gas to flow through the venturi under suction without the assistance of a fan.

3. The method of claim 1, wherein the alkaline fluid is sprayed co-currently with the flue gas stream in the direction of the venturi.

4. The method of claim 1, wherein the alkaline fluid comprises sea water.

5. A method for scrubbing a marine vessel flue gas containing particulates and sulfur dioxide comprising:
   spraying an alkaline fluid into the flue gas to produce a saturated flue gas stream containing the alkaline fluid;
   flowing the saturated flue gas stream containing the alkaline fluid through a venturi to cause the particulates in the flue gas to impact the alkaline fluid and react at least a portion of the sulfur dioxide with the alkaline fluid, wherein the alkaline fluid comprises sodium bicarbonate, sodium carbonate or a combination thereof.

6. The method of claim 1, wherein the method is performed onboard the marine vessel.

7. The method of claim 1, wherein the flue gas has a SO2 concentration of 150 to 2500 ppmv.

8. The method of claim 1, wherein 85% to 99% of the sulfur dioxide in the flue gas is removed, as measured on a mass transfer basis.

9. The method of claim 1, wherein 95 to 99% of particles of 2 micron or larger in the flue gas are removed, as measured on a mass transfer basis.

10. The method of claim 1, wherein 90 to 99% of particles of 1 micron and larger in the flue gas are removed, as measured on a mass transfer basis.

11. The method of claim 1, wherein the marine vessel has an operating power in the range of 0 to 80 MW.

12. The method of claim 1, further comprising collecting and recycling the alkaline fluid.

13. The method of claim 5, wherein the alkaline fluid is added in sufficient quantities to enable the flue gas to flow through the venturi under suction without the assistance of a fan.

14. The method of claim 5, wherein the alkaline fluid is sprayed co-currently with the flue gas stream in the direction of the venturi.

15. The method of claim 5, further comprising collecting and recycling the alkaline fluid.

16. A system for scrubbing a marine vessel flue gas comprising:
   a flue gas stream containing particulates and sulfur dioxide produced from the marine vessel;
   an alkaline fluid spraying system adapted to spray an alkaline fluid into the flue gas stream to produce a saturated flue gas stream containing the alkaline fluid;
   a venturi adapted to receive the saturated flue gas stream and impact the particulates in the flue gas onto the fluid and react at least a portion of the sulfur dioxide with the alkaline fluid; and
   a separator downstream of the venturi for separating water from the flue gas, wherein the separator is a scrubber, wherein the scrubber has a disengaging zone for receiving flue gas that has passed through the venturi and at least one packing section for receiving flue gas after it passes through the disengaging zone.

17. The system of claim 16, wherein the alkaline fluid spraying system sprays the alkaline fluid in sufficient quantities to enable the flue gas to flow through the venturi under suction without the assistance of a fan.

18. The system of claim 16, wherein the alkaline fluid spraying system sprays the alkaline fluid co-currently with the flue gas stream in the direction of the venturi.

19. The system of claim 16, wherein the alkaline fluid comprises sea water.

20. The system of claim 16, wherein the system is located onboard the marine vessel.

21. The system of claim 16, wherein the flue gas has a SO2 concentration of 150 to 2500 ppmv.

22. The system of claim 16, wherein the system removes 85% to 99% of the sulfur dioxide in the flue gas, as measured on a mass transfer basis.

23. The system of claim 16, wherein the system removes 95 to 99% of particles of 2 micron or larger in the flue gas, as measured on a mass transfer basis.

24. The system of claim 16, wherein the system removes 90 to 99% of particles of 1 micron and larger in the flue gas, as measured on a mass transfer basis.

25. The system of claim 16, wherein the marine vessel has an operating power in the range of 0 to 80 MW.

26. The system of claim 16, wherein the system operates in a closed loop mode.

27. The system of claim 16, where in the system is switchable between an open loop and a closed loop mode.

28. A system for scrubbing a marine vessel flue gas comprising:
    a flue gas stream containing particulates and sulfur dioxide produced from the marine vessel;
    an alkaline fluid spraying system adapted to spray an alkaline fluid into the flue gas stream to produce a saturated flue gas stream containing the alkaline fluid; and
    a venturi adapted to receive the saturated flue gas stream and impact the particulates in the flue gas onto the fluid and react at least a portion of the sulfur dioxide with the alkaline fluid, wherein the alkaline fluid comprises sodium bicarbonate, sodium carbonate or a combination thereof.

29. The system of claim 28, wherein the alkaline fluid spraying system sprays the alkaline fluid co-currently with the flue gas stream in the direction of the venturi.

30. The system of claim 28, wherein the system operates in a closed loop mode.

31. The system of claim 28, where in the system is switchable between an open loop and a closed loop mode.

* * * * *